Oct. 29, 1935.  G. WECHSLER  2,018,753
AUTOMATIC DEVICE FOR CLOSING THE CAGE AND WELL GATES OF LIFTS AND THE LIKE

Filed Nov. 7, 1934

Inventor:
Georges Wechsler
per: J. Severs
Attorney.

Patented Oct. 29, 1935

2,018,753

UNITED STATES PATENT OFFICE 2,018,753

AUTOMATIC DEVICE FOR CLOSING THE CAGE AND WELL GATES OF LIFTS AND THE LIKE

Georges Wechsler, Antwerp, Belgium

Application November 7, 1934, Serial No. 751,892
In Belgium February 6, 1934

6 Claims. (Cl. 187—52)

In the known construction of lifts, hoisting plants and the like, of the automatic or semi-automatic type, the cage and well gates remain closed and locked during the movement of the lift. This arrangement has as a consequence that, inversely, when the lift is at rest and a door remains open in front of the lift, the latter cannot be brought in movement, either directly by an operator on the spot, or by anyone pushing the call button at another floor.

The latter occurrence is frequently repeated, as indeed many users forget to completely close the cage gate or the well gate after having used the lift, and it results therefrom that any subsequent utilization and namely any automatic call from the cage is made impossible in these conditions, so that in each case one is obliged to use the staircase for closing the door which was left open.

The present invention has for its object to provide an automatic construction for closing the cage and well gates after the latter have been left open, and this after a determined time. Indeed, such construction should only operate with an appreciable delay, so as to avoid its action during the normal opening of the doors for entrance and exit of users.

By the fact that only the cage gate or the well gate in front of same and in the open position may cause the immobilization of the lift plant by such bad closure, it results therefrom that the automatic device according to the invention will only act after a time delay upon the cage gate and the well gate juxtaposed thereto.

The automatic device for closing the cage gate and well gate or the like according to the invention, is characterized by the fact that it comprises a motor device of any type, controlled by timed starting elements with eventually reversing devices, such elements being mounted upon the lift cage and arranged so as to operate elements mounted upon the cage gate and upon the well gate, for closing both.

The starting of the device is operated each time when the gate in front of the cage remains open and owing to this abnormal position of the door itself.

The device as mentioned herebefore may be operated by any motor group, either electric, electromagnetic, hydraulic, pneumatic or the like, and in each particular case, the different operative elements will be obviously of a construction appropriated to the functions and to the driving power used.

It is also possible to combine different power sources for operating such element of the device with the driving or regulating means which is best appropriated to the object aimed at.

Whatever may be the form of embodiment used, it may not interfere with the normal and manual operation of the doors either for closing or for opening, and this during a determined delay, which will be sufficient to allow in normal use the entrance and the exit of the users.

Owing to the multiple application possibilities, the device according to the invention will be preferably operated by means of electricity.

In this case and according to the invention, the device is characterized by the fact that it comprises swinging, pushing levers or the like, actuated by a motor duly geared down, which is under control of a starting device comprising a timed switch, operated by an electromagnet energized by means of a current, the circuit of which is normally closed when all the gates are closed.

The particular feature of these levers consists therein that they act under a swinging, pushing or other motion upon one of the movable upright members of an ordinary, collapsible or other otherwise operable gate.

Means are provided to bring the levers back to their rest position for allowing a subsequent opening and manual operation of any gate of the plant.

The automatic device for closing the gates is operated by the fact that any door in front of the cage remains open and interrupts, by its position, an electric contact of a timed electromagnet combined with a circuit breaker. The timed electromagnet is adjusted for a delay of 30 or 60 seconds or more or less.

One form of embodiment has been illustrated by way of example in the accompanying drawing.

Figure 1:
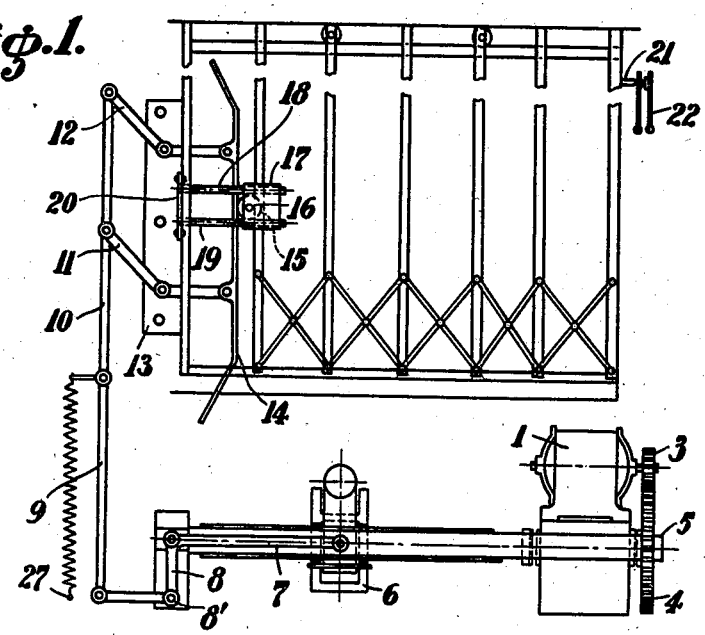
Fig. 1 is a diagrammatic front elevation of a lift gate provided with a device according to the invention.
Figure 2:
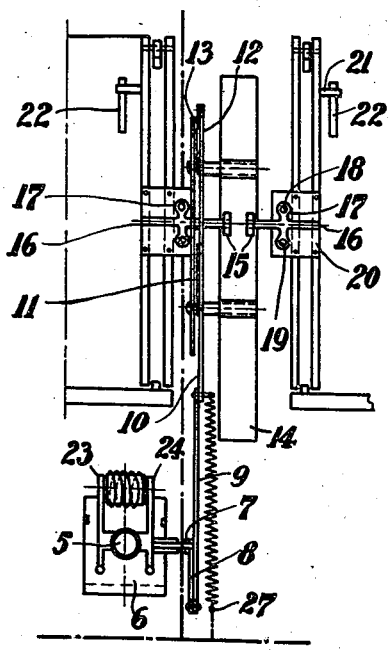
Fig. 2 is an end elevation of the device.

In the form of embodiment illustrated, the invention has been applied to lift and well gates of the collapsible type, so that the spacing of the uprights is transmitted by cross levers of the lazy tong type, and that it will be sufficient to exert a push upon one of the upright members for operating the closure of the gates.

The driving device will be preferably mounted upon the lift A and comprises, for instance, an electric motor 1 which, by means of the speed reducing gears 3 and 4, transmits a movement of rotation to a threaded shaft 5. Upon this threaded shaft 5 is capable of moving a clutching element 6, constituted with an electromagnet the opposite armatures 23 and 24 of which will engage the thread of the shaft 5 when brought together, so that such clutch member will be shifted along said shaft.

During its shifting movement, the clutch member 6 pulls a rod 7 pivoted to a bell-crank lever 8, pivotally mounted upon a spindle 8' and the free arm of which is pivoted to a link 9, which operates the rod 10 to which are pivoted the crank levers 11 and 12, pivoted upon a plate 13 fixed to the end upright of the collapsible gate.

To the free ends of the crank levers 11 and 12 is pivoted a push plate 14 which, during its movement, pushes the rollers 15 mounted to the ends of shafts 16, fixed to the guiding plate 17 provided with guiding sleeves sliding over bars 18 and 19, which are parallel to the plane of the gates and mounted upon a plate 20 mounted to the outer uprights of the gates, a helical pulling spring 27 is provided to bring all the elements back to their initial position when the clutch 6 is disconnected.

The opposite extreme upright of the collapsible gate is provided with a projecting arm 21, capable of acting upon the switch 22, which controls the circuit of the motor 1, said switch being fixed to the frame of the cabin gate or upon the frame of the well gate.

The plant will thus comprise a switch 22 at each floor.

Figure 3:
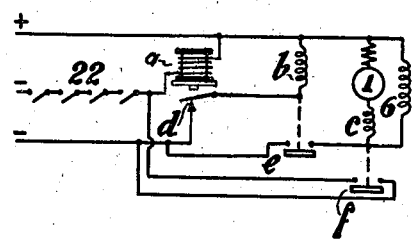
Fig. 3 is a diagram of the electric connections.

The controlling means of the motor 1 comprises three electromagnets a, b, c, see Fig. 3. The electromagnet a is of the timed type normally energized when all the gates are closed, i. e. when all the contacts 22 are closed. When one of the gates is opened, the contact d underneath the electromagnet a is closed and energizes the electromagnet b, so as to throw in the switch e for starting the motor 1, and the electromagnet of the clutching device 6, which moves the gate until it is entirely closed, so as to re-establish the contact 22 of the gate; by this, the electromagnet a is again energized so that the circuit in the electromagnet b is interrupted as also in the motor and the electromagnet of the clutching device 6.

The motor being stopped and the clutch 6 being disconnected, the helical spring 27 pulls the plate 14 and its connections as also the clutch 6 in their initial position.

If any user or a hindrance would prevent the closure of the gate, the motor 1 becomes blocked and taking the maximum current will act by overload upon the electromagnet c, which will close the circuit in switch f. This switch will close the circuit of electromagnet a, while interrupting the circuit in electromagnet b, that of the motor 1 and of the electromagnet of the clutching device 6, so that it will then be possible to open and close the gates manually.

It is obvious that the invention may be embodied by any other means than those described and that the driving elements as also the control devices may be arranged to operate as well rotating, sliding or otherwise movable gates.

I claim:

1. In elevators comprising an elevator cage, normal cage and well closure means, means to move the cage to any of the landing floors and to arrest the same at a selected landing floor, the arrangement of normally inactive means operating in combination with the normally operative closure means, responsive to said closure means being left open a predetermined time, for automatically bringing into operation the said normally inactive means to effect movement of said closure means to closed position.

2. In elevators comprising an elevator cage, normal cage and well closure means, means to move the cage to any of the landing floors and to arrest the same at a selected landing floor, the arrangement of normally inactive means operating in combination with the normally manually operated closure means, responsive to said closure means being left open a predetermined time, for automatically bringing into operation the said normally inactive means to effect movement of said closure means to closed position.

3. In elevators comprising an elevator cage, normal cage closure means, means to move the cage to any of the landing floors and to arrest the same at a selected floor, the arrangement of normally inactive means operating in combination with the normally operating closure means and intended to operate under emergency conditions, comprising a pivoted two-armed lever, one arm of which is arranged to close the gate, a rod connected to the other arm of the lever, a motor capable of moving the rod, means for bringing the pivoted lever back to its inactive position, a timed electromagnet controlling the starting of the motor, and a current circuit with switches arranged to feed said timed electromagnet and the motor in accordance with the emergency condition of the gate.

4. In elevators comprising an elevator cage, a normally operative cage gate of the collapsible type, means to move the cage to any of the landing floors and to arrest the same at a selected floor, the arrangement of normally inactive means operating in combination with the normally collapsible gate and intended to operate under emergency conditions, comprising two-armed levers pivoted upon the cage gate, one arm of which engages at least one upright lattice member of the gate, a rod connected to the other arm of the levers, a motor group capable of moving the rod, means for bringing the levers to their inoperative position, a timed electromagnet controlling the motor, a current circuit with circuit closing contacts upon the cage gate, said circuit being interrupted when the gate is open, the arrangement being such that the timed electromagnet acts to close the motor circuit, start the motor group and close the gate.

5. In elevators comprising an elevator cage, normally operative cage and well gates of the collapsible type, means to move the cage to any of the landing floors and to arrest the same at a selected floor, the arrangement of normally inactive means operating in combination with the normally operative gates and intended to operate under emergency conditions, comprising two-armed levers pivoted upon the cage gate, a push plate supported by said levers, arms projecting from the second upright member of the gates towards said push plate, guide means for said arms, a rod connected to the other arm of the levers, a two-armed lever pivoted upon the cage wall and to said rod, means for acting upon the second arm of said second lever, a motor group capable of moving the said second lever and supported by the cage, means for bringing the levers back to their inactive position, a timed electromagnet controlling the motor, a current circuit capable of energizing said electromagnet with circuit closing contacts upon the cage and well gates, said circuit being closed when the gates are normally closed.

6. In elevators comprising an elevator cage, normally operative cage and wall gates of the collapsible type, means to move the cage to any of the landing floors and to arrest the same at a selected floor, the arrangement of normally inactive means operating in combination with the normally operative gates and intended to operate under emergency conditions, comprising two-armed levers pivoted upon the cage gate, a push plate supported by said levers, arms projecting from the second upright member of the gates towards said push plate, guide means for said arms, a rod connected to the other arm of the levers, a two-armed lever pivoted upon the cage wall and to said rod, means for acting upon the second arm of said second lever, a motor group capable of moving the said second lever and supported by the cage, means for bringing the levers back to their inactive position, a timed electromagnet controlling the motor, a current circuit capable of energizing said electromagnet with circuit closing contacts upon the cage and well gates, said circuit being closed when the gates are normally closed, and electromagnetic means for operating the timed electromagnet when the motor is overloaded.

G. WECHSLER.